United States Patent [19]

Matsubara

[11] 4,285,655
[45] Aug. 25, 1981

[54] COAT HANGER DIE

[75] Inventor: Yutaka Matsubara, Tokyo, Japan

[73] Assignee: Toa Nenryo Kogyo Kabushiki Kaisha, Tokyo, Japan

[21] Appl. No.: 91,893

[22] Filed: Nov. 7, 1979

[30] Foreign Application Priority Data

Nov. 7, 1978 [JP] Japan .................. 53/136284

[51] Int. Cl.³ .................. B29F 3/04; B29D 7/04
[52] U.S. Cl. .................. 425/461; 264/176 R; 425/376 R
[58] Field of Search .................. 425/461, 376 R; 264/176 R

[56] References Cited

U.S. PATENT DOCUMENTS

| | | | |
|---|---|---|---|
| 3,382,535 | 5/1968 | Ferrari | 425/461 |
| 3,860,383 | 1/1975 | Sirevicius | 425/461 |
| 3,970,417 | 7/1976 | Page | 425/72 |
| 4,043,739 | 8/1977 | Appel | 425/461 |

FOREIGN PATENT DOCUMENTS

| | | |
|---|---|---|
| 722981 | 2/1955 | United Kingdom . |
| 759276 | 10/1956 | United Kingdom . |
| 798527 | 7/1958 | United Kingdom . |
| 849462 | 9/1960 | United Kingdom . |
| 963121 | 7/1964 | United Kingdom . |
| 993397 | 5/1965 | United Kingdom . |
| 1045328 | 10/1966 | United Kingdom . |
| 1081562 | 8/1967 | United Kingdom . |
| 1179730 | 1/1970 | United Kingdom . |

OTHER PUBLICATIONS

"Geometry Design of a Coat-Hanger Die . . . ", Polymer Engineering and Science, vol. 19, No. 3, 2-1979, pp. 169-172.
"Extrusion Die Design for Cast Film Production", Caton, British Plastics, Mar. 1971, pp. 95-99.
"Designing Coat-Hanger Dies by Power-Law Approximation" Chung et al., Modern Plastics, 3-1976, pp. 52-55.
"Computer Modeling of Coat Hanger Dies . . . " Klein et al., SPE Journal, vol. 29, 7-1973, pp. 33-37.
"Polymer Processing" by James M. McKelvey, Wiley and Sons, New York, 1962, pp. 31-32.

*Primary Examiner*—Jeffery R. Thurlow
*Attorney, Agent, or Firm*—W. T. Clarke; M. B. Kurtzman

[57] ABSTRACT

An improved coat hanger die is provided wherein the manifold is curved and wherein the manifold radius, coat hanger slit part thickness and the form of the coat hanger die are determined by a formula which is disclosed all in relation to the radius of the manifold at its inlet. The radius of the manifold at its inlet is selected in consideration of the flow characteristics of the resin melt to provide a low melt velocity at the inlet.

7 Claims, 4 Drawing Figures

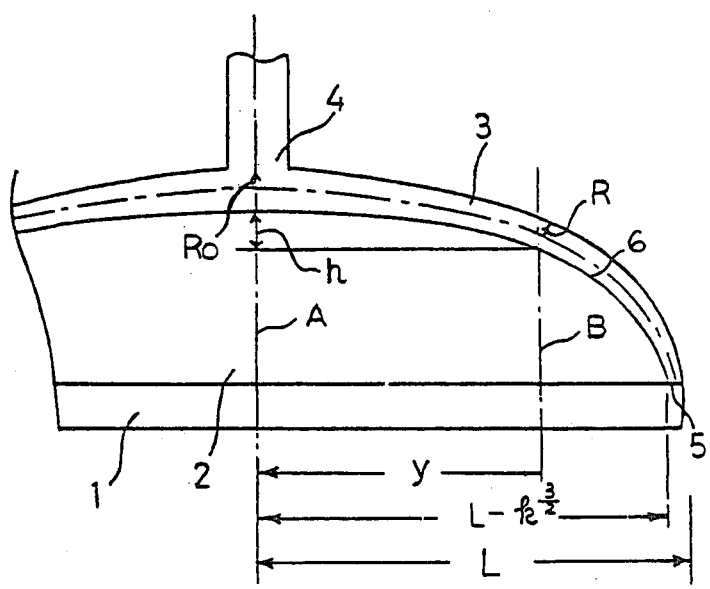
FIG. 1
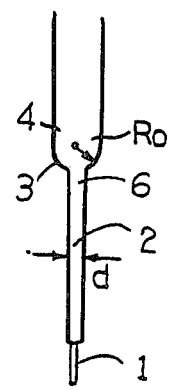
FIG. 2
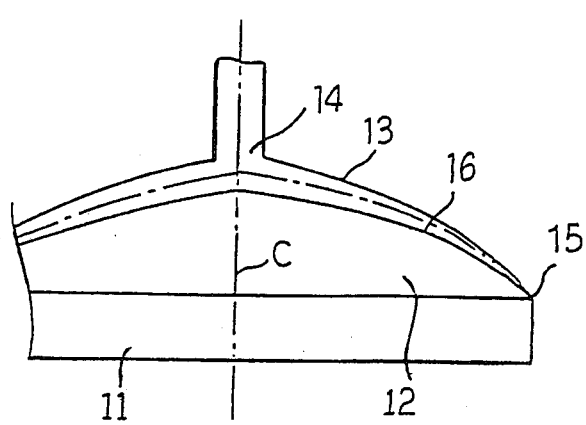
FIG. 3
FIG. 4

COAT HANGER DIE

FIELD OF THE INVENTION

This invention relates to a coat hanger die and more particularly, it is concerned with a short coat hanger die, i.e., one of limited extent in the machine direction.

DESCRIPTION OF PRIOR ART

Extrusion of sheets or films has hitherto been carried out, in general, by the use of a flat die, with the exception of inflation films, i.e., films produced by a blown-film process. As the flat die there are often used fish tail dies, manifold dies (T dies) and coat hanger dies. These dies are properly used depending on the kinds of resins and the thickness or width of sheets. The fish tail die is generally used when producing a narrow sheet from material of low flowability and which is readily decomposable by heat, such as hard vinyl chloride resin; and the manifold die is generally used when producing a wide sheet, especially such sheets or films of polyethylene, polypropylene, polystyrene or nylon.

When a wide sheet is produced by a fish tail die, it is necessary to design so that the length, i.e., the dimension in the machine direction, is extremely large. A manifold die has the disadvantages that the residence time of a resin passing through the die side ends is so long that deterioration of the resin due to heat is promoted, and this is aggravated by difficulties in temperature control due to the large mass of the die required to resist the high pressure of the resin. Dies resembling a coat hanger have been developed for the purpose of overcoming the disadvantages of these dies, and, at present, have widely been used. Such dies are called coat hanger dies.

BRIEF DESCRIPTION OF THE DRAWING

FIG. 1 is a plan view of a coat hanger die according to the present invention;

FIG. 2 is a cross-sectional view of the coat hanger die of FIG. 1 along line A;

FIG. 3 is a plan view of an ordinary coat hanger die; and

FIG. 4 is a cross sectional view of the coat hanger die of FIG. 3 along line C.

Referring to the Drawing in detail, FIG. 3 shows a conventional coat hanger die having a manifold part 13 in the inside of the die, which manifold part 13 extends in a form resembling a coat hanger, from the center at inlet 14 and tapers off to a side end 15 wherein the residence time distribution of the resin melt is made relatively uniform across the width of the die. The manifold part 13 is interconnected through inlet 16 with coat hanger slit part 12 which in turn is connected to die lip part 11. Coat hanger slit part inlet 16 extends from one end to the other of manifold part 13 and coat hanger slit part 12 encompasses all of the space inside the coat hanger manifold. Because of the feature that the residence time of a resin passing through it is relatively uniform across the width of the die, this known die is especially useful for the production of sheets or films of low heat stability resins such as hard vinyl chloride resins.

In such a coat hanger die, many improvements have been made by providing the die, for example, with a die lip with various mechanisms providing adjustability to control uniformity of distribution of the flow rate of resin per unit width of die.

In the coat hanger die, it has been proposed to maintain the flow rate across the width of die uniform, British Plastics, March 1971, pp 95–99, Modern Plastics, March 1976, pp 52–55, and SPE Journal, Vol. 29, July 1973, pp 33–37 (A). Thereafter it has been proposed to maintain the flow rate per unit width of the die and the residence time of a resin flowing throughout the die uniform across the width of the die, Polymer Engineering and Science, Vol. 19, No. 3, 1979, pp 169–172 (B).

However, a die capable of meeting these two requirements at the same time (uniform flow rate and uniform residence time) according to the literature (B) is a long coat hanger, in other words, has a small opening angle of the manifold part. This results in a big body, a factor which the coat hanger die was supposed to reduce.

In a flat die, in general, a uniform flow rate is substantially essential, but a uniform residence time is not always required. Depending upon the thermal decomposition rate of the resin material to be extruded through the die, it is allowable to increase somewhat the ratio of the residence time of the resin taking a roundabout way to the side ends of the die to the residence time of the resin flowing along the center line of the die.

SUMMARY OF THE INVENTION

In accordance with the invention, it has been found that according to the following formulae, it is possible to obtain such a geometry that the length (the dimension in the machine direction) of a coat hanger die is small and the length of a coat hanger slit part is small, while the definition of the size of an equivalent circle to the cross section of a manifold part is held as disclosed in the foregoing literature (B). Thus, the present invention is accomplished whereby the die cost is lowered and the inconvenience of die handling is eliminated.

That is to say, (referring in detail to FIG. 1), the gist of the present invention consists in a coat hanger die comprising a die lip part 1, coat hanger slit part 2, manifold part 3, manifold inlet 4, coat hanger slit part inlet 6, in which the radius R of circle equivalent to the cross section of the manifold part 3, in contact with the coat hanger slit part 2 on a line B apart by a distance y in the direction from the center line A of the die to the side end 5 of the die, is defined by the following formula (1), the interior thickness space d of the coat hanger slit part 2, is defined by the following formula (2), and the height difference h of the coat hanger slit part 2 on the line B apart by a distance y in the direction from the center line A to the side end 5 of the die is defined by the following formula (3):

$$R = R_o (1 - y/L)^{\frac{1}{3}} \qquad (1)$$

in which $R_o$ is the radius of circle equivalent to the cross section of the manifold part 3 on the center line A of the die and L is the required half width of the die, $$d = \left[ R_o/m^{\frac{1}{3(n+1)}} \cdot \pi^{-\frac{1}{3}} \cdot \left( \frac{3n+1}{2(2n+1)} \right)^{-\frac{n}{3(n+1)}} \cdot L^{\frac{1}{3}} \right]^{\frac{3}{2}} \qquad (2)$$

in which n is the flow behavior index (J. M. McKelvey, Polymer Processing, p 32, John Wiley (1962)) of the melt resin and m is the ratio of the residence time of a resin flowing through the manifold inlet 4, manifold part 3 and die side end 5 to the residence time of a resin flowing through the manifold inlet 4 and the coat hanger slit part 2 along the center line A of the die, and $$h = \frac{3}{2} \cdot k^{\frac{1}{2}} \left[ L^{\frac{1}{3}} \sqrt{L^{\frac{2}{3}} - k} - (L - y)^{\frac{1}{3}} \sqrt{(L-y)^{\frac{2}{3}} - k} + k\log_e \left( \frac{L^{\frac{1}{3}} + \sqrt{L^{\frac{2}{3}} - k}}{(L-y)^{\frac{1}{3}} + \sqrt{(L-y)^{\frac{2}{3}} - k}} \right) \right] \quad (3)$$

in which $k = m^{\frac{-2(3n+1)}{3(n+1)}} \cdot (\pi d)^{\frac{2}{3}} \cdot \left( \frac{3n+1}{2(2n+1)} \right)^{\frac{4n}{3(n+1)}}$ In the above described formulae, n ranges from $\frac{1}{2}$ to $\frac{1}{4}$ in the case of commonly used resins, m ranges from 1 to 50, preferably 2 to 20, h ranges from zero at line A to a maximum at side end 5 and y ranges from 0 at line A to $L-K^{3/2}$ at side end 5, because y greater than $L-k^{3/2}$ makes h a complex number which has no practical meaning.

Obviously the man skilled in the art will know that in order to develop formulae such as those above, assumptions regarding resin melt viscosity, melt flow, melt temperature, residence time, etc., would need be made. Certain of these assumptions have acquired general use in the art. Accordingly, in developing the above formulae, the following customary assumptions apply:

1. Resin melt viscosity can be described by the so-called power-law equation (Table 2-4, J. M. McKelvey, Polymer Processing, John Wiley, 1962).
2. Melt temperature is uniform throughout all the flow stream.
3. Melt flow is laminar.
4. The flow along the manifold, and the flow into the coat hanger slit part are independent of each other.
5. Melt in the coat hanger slit part flows only along the machine direction.
6. Residence time of melt is calculated as a flow path divided by an average velocity.

In the present invention, there is provided a short coat hanger die, i.e., with a large opening angle of the coat-hanger shaped manifold part, having a uniform flow rate in the width direction of a resin leaving the coat hanger slit part 2, and at the same time, while permitting a greater residence time of portions of resin taking a roundabout way to the side end 5 of the die than the residence time of portions of resin flowing along the center line of the die, i.e., permitting such residence time to be multiplied several times, but limited to such a range that there is little uneven thermal decomposition of an extruded article.

When m is varied from 1 to 4 and 16 while the value of n is kept constant, for example, the height difference h of the coat hanger slit part 2 at the side end 5, if h=1 where m=1, is 0.41 where m=4 and 0.17 where m=16, and the distance d, if d=1 where m=1, is 0.57 where m=4 and 0.33 where m=16.

The above three cases of designed data are obtained by substituting Ro=2.0065 [cm], L=100 [cm], n=$\frac{1}{2}$, into the formulae (1), (2) and (3), for m=1,4 and 16 each.

In case of m=1
d=0.53167 [cm]
$L-k^{3/2}$=98.654 [cm]
h=38.926 [cm] at y=98.654 [cm]
$2R=2Ro(1-[L-k^{3/2}/L])^{\frac{1}{2}}$=0.954 [cm] at y=98.654 [cm]
In case of m=4
d=0.30536 [cm] $L-k^{3/2}$=99.888 [cm]h=15.942 [cm] at y=99.888 [cm]2R=0.416 [cm] at y=99.888 [cm]
In case of m=16
d=0.17538 [cm]
$L-k^{3/2}$=99.991 [cm]
h=6.806 [cm] at y=99.991 [cm]
2R=0.179 [cm] at y=99.991 [cm]

We considered here the h value at $y=L-k^{3/2}$, because y greater than $(L-k^{3/2})$ makes h a complex number in formula (3) which has no practical meaning.

The values of $(L-k^{3/2}+2R)$ in the above example are greater than L=100 [cm] by −0.392 [cm], +0.304 [cm] and +0.17 [cm] each, and these differences are sufficiently small compared with the resin melt swelling at each die opening side end. Therefore, it can be said that geometric design of a die with L=100 [cm] was accomplished in each case. The coat hanger die shows a low height and small distance with the increase of m.

Therefore, a low price coat hanger die can be obtained approximately by selecting a value over 10 for m, defining the size of an equivalent circle in the manifold part 3 as described in the foregoing literature (B) and employing the method and formulae of the invention to define height difference h and distance d of the coat hanger slit part 2.

When formed articles such as sheets with a thickness of 0.25 to 0.5 mm and films with a thickness less than 0.25 mm are made of thermoplastic resins such as polyvinyl chlorides, polyolefins, polyamides, polyesters, polystyrenes, polyvinylidene chlorides and ABS resins using the coat hanger die of the present invention having the structure as shown in FIG. 1, the resulting articles have uniform quality in the width direction of the die as well as uniform thickness.

Since the coat hanger die of the present invention has such a structure, as shown in FIG. 1, that either far end of the manifold part 3 is connected with the die lip part 1 at either side end part 5 of the die perpendicularly to the die lip part 1, i.e., along the machine direction of the die, while holding a certain limited radius of equivalent circle at either far end of the manifold part 3, deterioration of the physical properties and variations in the thickness of an extruded article at the side are suppressed.

The die of the present invention is useful with the resins as set forth above. Above all, the die is especially useful with resins having a tendency to thermal decomposition during extruding, in particular, polyvinyl chloride and polypropylene.

In the following examples, films were formed using as a die a T die (manifold die) and a coat hanger die of the present invention and as the resin extruded polypropylene. Tensile modulus was determined on the films formed. In particular, even if the height difference (h) is held as low as that of the T die by setting m at 8, the film produced by the present invention gives a more uniform property as evident from the following table.

EXAMPLE 1 (Comparative Example)

| Resin: | Polypropylene, melt flow rate = 9 (at 230° C.) |
|---|---|
| Die: | T die |

-continued

| | |
|---|---|
| | Die lip width (2 L) = 76.2 cm |
| | External dimension from inlet: |
| | length = 17 cm |
| | depth = 24 cm |
| Processing temperature: | 240° C. |

EXAMPLE 2

| | |
|---|---|
| Resin: | same as Example 1 |
| Die: | Coat hanger die, |
| | die, lip width (2 L) = 76.2 cm |
| | External dimension from inlet: |
| | length = 17 cm |
| | depth = 25 cm |
| | where m = 8, |
| | h (at die side end 5) = 3.95 cm |
| | d = 0.088 cm |
| Processing temperature: | 240° C. |

EXAMPLE 3

| | |
|---|---|
| Resin: | same as Example 1 |
| Die: | Coat hanger die |
| | Die lip width (2 L) = 76.2 cm |
| | External dimension from inlet: |
| | length = 17 cm |
| | depth = 35 cm |
| | where m = 1, |
| | h (at die side end 5) = 14.83 cm |
| | d = 0.202 cm |
| Processing temperature: | 240° C. |

TABLE

| Example No. | 1 | 2 | 3 |
|---|---|---|---|
| Thickness of film (μ) | 25 | 25 | 25 |
| 1% Tensile modulus (Kg/cm²) (ASTM D-882) | | | |
| Central part of film | 9,040 | 9,020 | 9,010 |
| Part 5 cm from side end of film | 8,100 | 8,820 | 9,020 |

What is claimed is:

1. A coat hanger die comprising a coat hanger slit part, manifold part and manifold inlet part, wherein the manifold part is in the form of a coat hanger wherein the depth of the coat hanger slit part is defined by the following formula (2):

$$d = \left[ Ro/m^{\frac{1}{3(n+1)}} \cdot \pi^{-\frac{1}{2}} \cdot \left\{ \frac{(3n+1)}{2(2n+1)} \right\}^{\frac{n}{3(n+1)}} \cdot L^{\frac{1}{2}} \right]^{\frac{3}{2}} \quad (2)$$

in which Ro is the radius of a circle equivalent to the cross section of the manifold on the center line of the die, n is the flow behavior index of the melt resin, m is the ratio of the residence time of a resin flowing through the manifold and die side end to the residence time of a resin flowing through the coat hanger slit part along the center line of the die and ranges from 1 to 50, L is the required half width of the die, and wherein the customary assumptions regarding resin melt viscosity, melt flow through the die, melt temperature and residence time have been made.

2. A coat hanger die according to claim 1 wherein the radius R of a circle equivalent to the cross section of the manifold in contact with the coat hanger slit part on a line apart by a distance y in the direction from the center line of the die to the side end is defined by the formula (1):

$$R = Ro(1 - y/L)^{\frac{1}{3}} \quad (1)$$

wherein L is the required half width of the die.

3. A coat hanger die according to claim 2 wherein the height difference h of the coat hanger slit part on a line apart by a distance y in the direction from the center line of the die to the side end is defined by the formula (3):

$$h = \frac{3}{2} \cdot k^{\frac{1}{2}} \left[ L^{\frac{1}{2}} \sqrt{L^{\frac{3}{2}} - k} - (L-y)^{\frac{1}{2}} \sqrt{(L-y)^{\frac{3}{2}} - k} + k \log_e \left\{ \frac{L^{\frac{1}{2}} + \sqrt{L^{\frac{3}{2}} - k}}{(L-y)^{\frac{1}{2}} + \sqrt{(L-y)^{\frac{3}{2}} - k}} \right\} \right] \quad (3)$$

in which $k = m^{\frac{-2(3n+1)}{3(n+1)}} \cdot (\pi d)^{\frac{3}{2}} \cdot \left( \frac{(3n+1)}{2(2n+1)} \right)^{\frac{4n}{3(n+1)}}$ 4. A coat hanger die according to claim 3 wherein the resin used is selected from the group of thermoplastic resins consisting of polyvinyl chlorides, polyolefins, polyamides, polyesters, polystyrenes, polyvinylidene chlorides and ABS resins.

5. A coat hanger die according to claim 4 wherein the resin is polypropylene.

6. A coat hanger die according to claim 1 wherein m ranges from 2 to 20.

7. A coat hanger die according to claim 3 wherein the resin is polypropylene having a melt flow rate of 9, the die lip width (2L) is 76.2 cm, d is 0.088 cm and m is 8.

* * * * *